US012780522B2

(12) United States Patent
Tolleson

(10) Patent No.: US 12,780,522 B2
(45) Date of Patent: Nov. 3, 2026

(54) LINER FOR AN OVERPACK ASSEMBLY

(71) Applicant: ENTEGRIS, INC., Billerica, MA (US)

(72) Inventor: Alex B. Tolleson, Minneapolis, MN (US)

(73) Assignee: ENTEGRIS, INC., Billerica, MA (US)

( * ) Notice: Subject to any disclaimer, the term of this patent is extended or adjusted under 35 U.S.C. 154(b) by 0 days.

(21) Appl. No.: 19/187,787

(22) Filed: Apr. 23, 2025

(65) Prior Publication Data

US 2025/0250087 A1 Aug. 7, 2025

Related U.S. Application Data

(62) Division of application No. 17/962,250, filed on Oct. 7, 2022, now Pat. No. 12,304,715, which is a division of application No. 16/696,748, filed on Nov. 26, 2019, now Pat. No. 11,498,738.

(60) Provisional application No. 62/785,020, filed on Dec. 26, 2018.

(51) Int. Cl.

| | |
|---|---|
| ***B65D 77/06*** | (2006.01) |
| ***B65D 23/02*** | (2006.01) |
| ***B65D 25/16*** | (2006.01) |
| *B31B 50/64* | (2017.01) |
| *B31B 70/14* | (2017.01) |
| *B31B 70/26* | (2017.01) |

(Continued)

(52) U.S. Cl.

CPC ............. *B65D 77/06* (2013.01); *B65D 23/02* (2013.01); *B65D 25/16* (2013.01); *B31B 50/64* (2017.08); *B31B 70/14* (2017.08); *B31B 70/26* (2017.08); *B31B 70/64* (2017.08); *B31B 2120/407* (2017.08)

(58) Field of Classification Search

CPC ........ B65D 23/02; B65D 25/16; B65D 77/06; B31B 50/00; B31B 50/64; B31B 70/26; B31B 70/14; B31B 70/64; B31B 2120/407; B67D 2001/0827

See application file for complete search history.

(56) References Cited

U.S. PATENT DOCUMENTS

| | | | |
|---|---|---|---|
| 4,548,321 | A | 10/1985 | Mockesch et al. |
| 4,898,301 | A | 2/1990 | Schick |
| 5,169,037 | A | 12/1992 | Davies et al. |

(Continued)

FOREIGN PATENT DOCUMENTS

| | | | |
|---|---|---|---|
| CN | 1735537 | A | 2/2006 |
| CN | 102548868 | B | 12/2014 |

(Continued)

*Primary Examiner* — Thomas M Wittenschlaeger

(57) ABSTRACT

An overpack assembly and a method of making an overpack assembly is disclosed. The overpack assembly includes a liner positioned within an overpack. In one embodiment, the method includes making a liner including providing a first sheet including a fitment positioned over a second sheet, the first sheet attached to the second sheet along an attachment seam at an entire perimeter edge. The first sheet is pulled apart from the second sheet at a center of the liner, forming a three-dimensional liner with triangular wings. A vertical seam is formed across each triangular wing, the vertical seam being perpendicular to the attachment seam, where a length of the vertical seam corresponds to the height of the liner when in use. The liner is positioned within the over-pack.

10 Claims, 12 Drawing Sheets

(51) Int. Cl.

| | |
|---|---|
| *B31B 70/64* | (2017.01) |
| *B31B 120/40* | (2017.01) |

(56) References Cited

U.S. PATENT DOCUMENTS

| | | | |
|---|---|---|---|
| 5,938,338 | A | 8/1999 | Mcdonough et al. |
| 6,126,315 | A | 10/2000 | Ichikawa et al. |
| 6,328,470 | B2 | 12/2001 | Brown et al. |
| 6,332,711 | B1 | 12/2001 | Inuzuka et al. |
| 6,527,445 | B2 | 3/2003 | Lafleur et al. |
| 6,656,101 | B2 | 12/2003 | Tisi |
| 8,777,047 | B2 * | 7/2014 | Blomberg .............. B65D 25/16 383/96 |
| 9,573,747 | B2 | 2/2017 | Koland et al. |
| 9,573,757 | B1 | 2/2017 | Stravitz |
| 9,631,774 | B2 | 4/2017 | Tom et al. |
| 9,802,808 | B2 * | 10/2017 | O'Dougherty ....... B67D 7/0288 |
| 10,046,870 | B2 | 8/2018 | Ouellette |
| 11,110,032 | B2 * | 9/2021 | Bazin ........................ A61J 1/10 |
| 11,332,304 | B2 | 5/2022 | Georgelos et al. |
| 11,498,738 | B2 * | 11/2022 | Tolleson ................. B31B 50/00 |
| 11,634,273 | B2 | 4/2023 | Mckee et al. |
| 2001/0002675 | A1 * | 6/2001 | Wilcox ................ B67D 7/0255 383/41 |
| 2003/0024950 | A1 | 2/2003 | Yoneyama et al. |
| 2005/0243149 | A1 | 11/2005 | Matsumoto |
| 2013/0193164 | A1 | 8/2013 | Tom et al. |
| 2013/0214138 | A1 | 8/2013 | Chiarello et al. |
| 2014/0183222 | A1 | 7/2014 | Morrison et al. |
| 2014/0374416 | A1 | 12/2014 | Tom et al. |
| 2016/0122107 | A1 | 5/2016 | Pansegrouw |
| 2018/0029864 | A1 | 2/2018 | Blackburn |
| 2018/0290815 | A1 * | 10/2018 | Waltermire ........ B65D 81/3897 |

FOREIGN PATENT DOCUMENTS

| | | | |
|---|---|---|---|
| DE | 2652454 | A1 | 5/1978 |
| EP | 2476634 | B1 | 4/2016 |
| JP | 2010235197 | A | 10/2010 |
| WO | 2008095024 | A9 | 10/2008 |
| WO | 2013070516 | A1 | 5/2013 |
| WO | 2018096226 | A1 | 5/2018 |

* cited by examiner

LINER FOR AN OVERPACK ASSEMBLY

RELATED APPLICATIONS

This application is a continuation of U.S. patent application Ser. No. 17/962,250 filed Oct. 7, 2022 (now U.S. Pat. No. 12,304,715 issued May 20, 2025), which is a divisional of U.S. patent application Ser. No. 16/696,748 filed Nov. 26, 2019 (now U.S. Pat. No. 11,498,738 issued Nov. 15, 2022), which claims priority to and the benefit of U.S. Provisional Application No. 62/785,020 filed Dec. 26, 2018, all of which are incorporated herein by reference in their entirety for all purposes.

TECHNICAL FIELD

This disclosure generally relates to liners for use with overpack assembly and methods of making such liners.

BACKGROUND

Overpack assemblies are used for storing, shipping, and dispensing materials. One type of storage and dispensing system includes an overpack assembly having a liner positioned within an overpack. The liner is filled with a material that may be stored, shipped, and then dispensed at a later time. Such overpack assemblies have been termed a bag in a bottle system.

Some liners used in bag-in-a bottle systems are formed as a two-dimensional bag. Two flat pieces or material sheets are secured together at the edges. A connector, in some applications known as a fitment, may be located along one of the liner edges. The fitment allows fluid access in and out of the two-dimensional liner bag. In typical applications, the two-dimensional liners are used for storing, shipping, and dispensing materials in a three-dimensional container such as a bottle or rectangular-shaped overpack. Positioning two-dimensional liners in three-dimensional containers can result in dispensability problems, volume optimization, and structural concerns due to wrinkles and creases in the liner. Further, cleanliness issues may exist due to problems with cleaning the liners.

SUMMARY

This disclosure generally relates to liners for use with overpack assembly and methods of making such liners.

In one embodiment, a method of making an overpack assembly includes making a liner by providing a first sheet including a fitment positioned over a second sheet, the first sheet attached to the second sheet along an attachment seam at an entire perimeter edge, and pulling the first sheet apart from the second sheet at a center of the liner, forming a three-dimensional liner with triangular wings. The first sheet and second sheet can be square-shaped. The liner is then positioned within an overpack. In one embodiment, the method includes folding the liner for positioning the liner in the overpack. In some embodiments, a vertical seam is formed across each triangular wing, the vertical seam being perpendicular to the attachment seam, where a length of the vertical seam corresponds to the height of the liner when in use. In some cases, each triangular wing can be flattened prior to forming the vertical seam. The vertical seam can be welded. In certain cases, each triangular wing can be truncated along the vertical seam to form truncated triangular wings, and each truncated triangular wing can be folded inward towards a central axis of the liner prior to positioning the liner within the overpack. The method can include positioning the fitment in an opening of the overpack. The overpack can include a neck having an opening and a retainer can be positioned about the fitment to secure the liner within the overpack. A connector assembly can be coupled to the fitment to secure the liner within the overpack. The liner can be inflated and filled with a desired material.

In other embodiments, a method of making an overpack assembly having a three-dimensional liner includes making a liner by providing a two-dimensional liner including a first rectangular sheet with a fitment positioned over a second rectangular sheet, the first rectangular sheet attached to the second rectangular sheet along an attachment seam at a perimeter edge, and pulling the first rectangular sheet apart from the second rectangular sheet at a center of the two-dimensional liner, forming the three-dimensional liner with triangular wings. The liner is then positioned within an overpack.

In one embodiment, pulling the first rectangular sheet apart from the second rectangular sheet is done along a central axis generally orthogonal to the first rectangular sheet and the second rectangular sheet, causing the attachment seam to fold inward toward the central axis creating the triangular wings. The triangular wings can be flattened, and a side seam can be across each triangular wing, the side seam being spaced from and parallel to the central axis. In certain embodiments, the triangular wing can be truncated along each side seam. The side seams can be formed by forming a weld band. A welding device can be used to form the side seams. The first rectangular sheet and the second rectangular sheet can be defined to be square-shaped and, in some embodiments, can be formed form a fluoropolymer. The finished liner can be inserted into an overpack, inflated and filled with a desired material.

According to various other embodiments, an overpack assembly includes an overpack; and a liner positioned within the overpack. The overpack can be rectangular-shaped or cylindrical shaped. The liner can include a box-shaped liner body made of a fluoropolymer material having a top surface, a bottom surface, and four side surfaces; a liner seam extending substantially horizontally across the middle of each of the four side surfaces; a side seam extending vertically between each adjacent side surface; and a fitment extending from the top surface. In one embodiment, the liner seam and each side seam are a weld seam. In some embodiments, an interface between the top surface and each side surface is void of a seam, and/or an interface between the bottom surface and each side surface is void of a seam.

BRIEF DESCRIPTION OF THE DRAWINGS

The disclosure may be more completely understood in consideration of the following description of various illustrative embodiments in connection with the accompanying drawings

Figure 1:
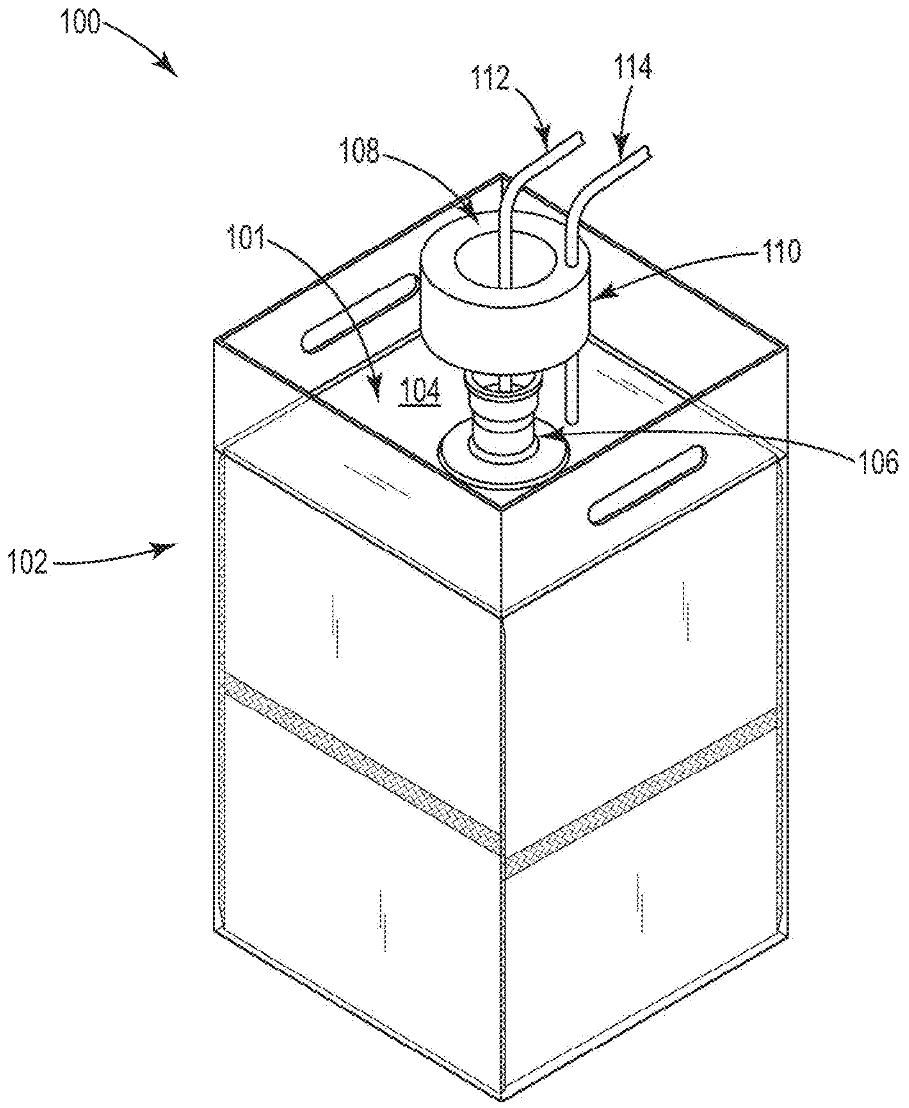
FIG. 1 is a perspective view of an overpack assembly in accordance with an embodiment of the disclosure.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DETAILED DESCRIPTION

The following detailed description should be read with reference to the drawings in which similar elements in different drawings are numbered the same. The detailed description and the drawings, which are not necessarily to scale, depict illustrative embodiments and are not intended to limit the scope of the invention. The illustrative embodiments depicted are intended only as exemplary. Selected features of any illustrative embodiment may be incorporated into an additional embodiment unless clearly stated to the contrary.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The term "about" generally refers to a range of numbers that is considered equivalent to the recited value (e.g., having the same function or result). In many instances, the term "about" may include numbers that are rounded to the nearest significant figure.

Numerical ranges expressed using endpoints include all numbers subsumed within that range (e.g. 1 to 5 includes 1, 1.5, 2, 2.75, 3, 3.80, 4 and 5).

Directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting.

An overpack assembly and method of making an overpack assembly is disclosed. The overpack assembly includes a liner positioned within an overpack. In one embodiment, the overpack assembly includes a liner that is a three-dimensional liner formed from a simple two-dimensional liner, without the need for complex side weld seams or attachments. The liner can be filled with a material for storage, shipping, and/or dispensing at a later time. The liner is operably positioned within a more rigid outer container termed an overpack.

FIG. 1 illustrates one embodiment of an overpack assembly generally at 100. The overpack assembly 100 can be used as part of a "bag in a bottle" (BIB) or "bag in a can" (BIC) system. In the illustrative embodiment, the overpack assembly 100 includes a liner 101 positioned within an overpack 102 (i.e., a container). The overpack 102 has a shape suitable for its intended use. In one illustrative embodiment, the overpack 102 has a rectangular shape. In another embodiment, the overpack 102 has different shape such as a round or cylindrical shape.

Liner 101 is a three-dimensional liner formed from a two-dimensional liner. The liner 101 is suitable for being filled with a material for storage, shipping, and/or dispensing at a later time. Liner 101 includes a liner body 104. A fitment 106 extends from the liner body 104. A retainer (not shown) aids in retaining the fitment within an opening in overpack 102. In one embodiment, the fitment 106 cooperates with a connector assembly 108 for use in transferring material in and out of the liner body 104 positioned with the overpack 102. One example of fitment suitable for use with liner 101 is available under the registered trademark NOWPAK® from Entegris of Billerica, Massachusetts.

In one embodiment, connector assembly 108 includes a cap 110, dispensing tube 112 and fill tube 114. One suitable cap for use with connector assembly 110 is available under the tradename SmartCap from Entegris of Billerica, Massachusetts.

Embodiments of an overpack assembly 100 including liner 101 and methods of making an overpack assembly 100 including liner 101 an overpack 102 are described in detail further in this specification.

Figure 2:
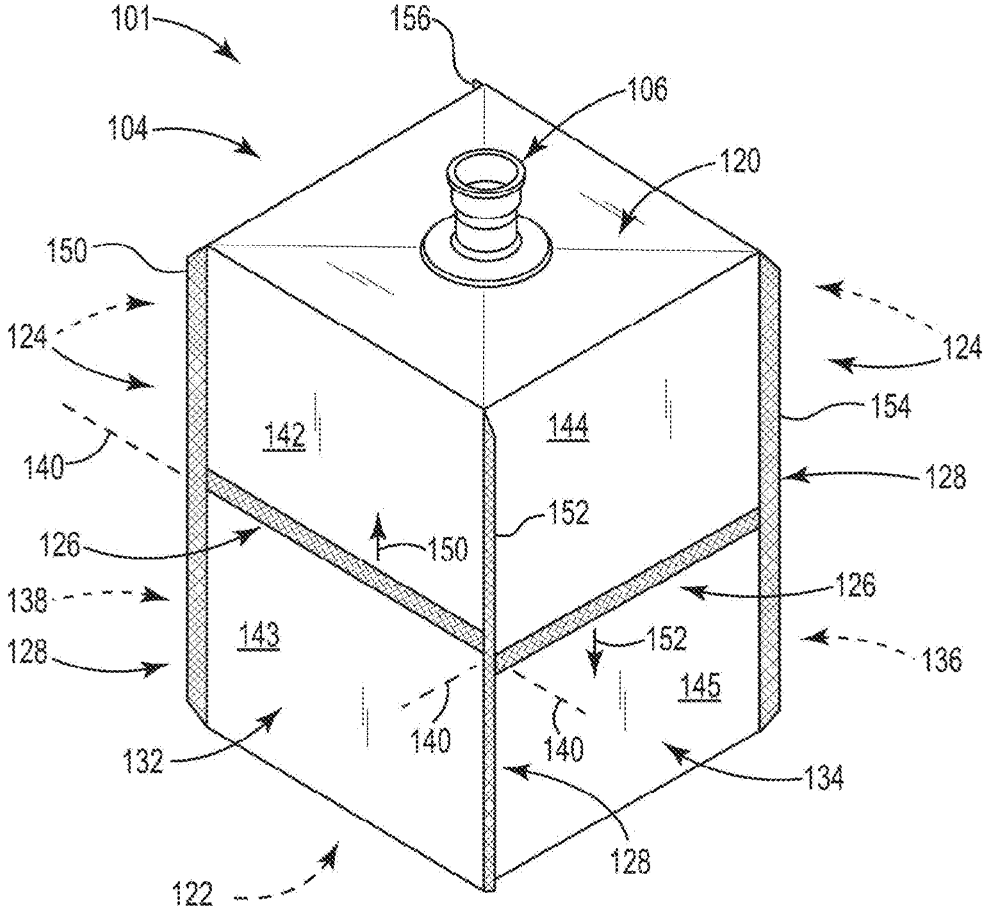
FIG. 2 is a perspective view of a liner suitable for use in an overpack assembly in accordance with an embodiment of the disclosure.

FIG. 2 is a perspective view further illustrating one embodiment of liner 101 suitable for use with overpack assembly 100. Liner 101 is a three-dimensional liner formed from a two-dimensional liner. Liner 101 includes liner body 104, illustrated in an expanded shape. In one embodiment, liner 101 has a box shape. When positioned within a container such as an overpack, liner 101 is expanded and will generally take on the interior shape of the container. Typical overpack containers have an interior shape that is a geometrical shape, such cylindrical or box shaped sidewalls, and may also have a shaped bottom such as a flat or rounded bottom.

In the illustrated embodiment of FIG. 2, liner body 104 includes four sides 124—liner side 132, liner side 134, liner side 136 and liner side 138. Liner perimeter seam 126 extends across all four sides 124—including liner side 132, liner side 134, liner side 136 (on backside indicated by dashed arrow) and liner side 138 (on back side indicated by dashed arrow) along a common seam line indicated at 140. In the illustrated embodiment, liner side 132 includes top panel 142 and bottom panel 143; liner side 134 includes top panel 144 and bottom panel 145. Liner perimeter seam 126 secures top panel 142 to bottom panel 143, and secures top panel 144 to bottom panel 145 along seam line 140.

Each adjacent side 124 is secured to each other via a vertical side seam 128. In liner body 104, vertical side seams 128 extend from top 120 to bottom 122. In one embodiment, side seam 150 secures liner side 138 to liner side 132; side seam 152 secures liner side 132 to liner side 134; side seam 154 secures liner side 134 to liner side 136; and side seam 156 secures liner side 136 to liner side 138. The length of vertical side seams 128 corresponds to the height of liner 100 when the liner 100 is in an expanded state (i.e., when in use and filled with a desired material).

A seamless transition exists between the top 120 and the four sides 124. In a similar manner, a seamless transition exists between the bottom 122 and the four sides 124. In other embodiments, seams could exist between the top 120 and four sides 124, and between the bottom 122 and the four sides 124.

In one embodiment, the liner perimeter seam 126 and side seam 128 are welded seams. As a result of this seam configuration, perimeter seam 126 across liner side 132 is folded upward from seam line 140, indicated by arrow 160, and perimeter seam 126 across liner side 134 is folded downward, indicated by arrow 162. In other embodiment, perimeter seam 126 may be folded in different directions or fold in the same direction across the four sides 124. In other embodiments, excess material from perimeter seam 126 may be removed.

Typical storage materials include gas or liquid storage materials. In one embodiment, the liner is used as part of an overpack assembly to store a liquid reagent for semiconductor manufacturing. In another embodiment, the liner 101 is used to store materials used in the health care or medical industry. The liner 101 may or may not be a re-useable liner.

The liner body 104 is made of a flexible film material. In various embodiments, the flexible film material is a polymeric material. Suitable polymeric materials include polyethylene, polytetrafluoroethylene, polypropylene, polyurethane, polyvinylidene chloride, polyvinylchloride, polyacetal, polystyrene, polyacrylonitrile, and polybutylene. In one embodiment, the liner body 104 is made of a polytetrafluoroethylene (PTFE). In other embodiments, the liner body 104 can be made of a combination of materials or a number of material layers. The material layers may be different materials. The fitment, retainer and overpack (See FIG. 1) are made of a generally rigid polymeric material. In one embodiment, the fitment is made of injection molded natural virgin PFA, the retainer is made of injection molded natural virgin HDPE, and the overpack is made of injection molded LDPE. In other embodiment, the fitment, retainer and overpack are made of other materials.

Any suitable thickness of liner body 104 is contemplated by the present disclosure. For example, the liner body 104 can have an overall thickness of about 80 microns to 280 microns. The liner body 104 can have a greater thickness (e.g., 200 microns) or a relatively smaller thickness (e.g., 100 microns), based on the type of material, amount of material, and overpack used for the storage, transportation and dispensing of the material.

Figure 3:
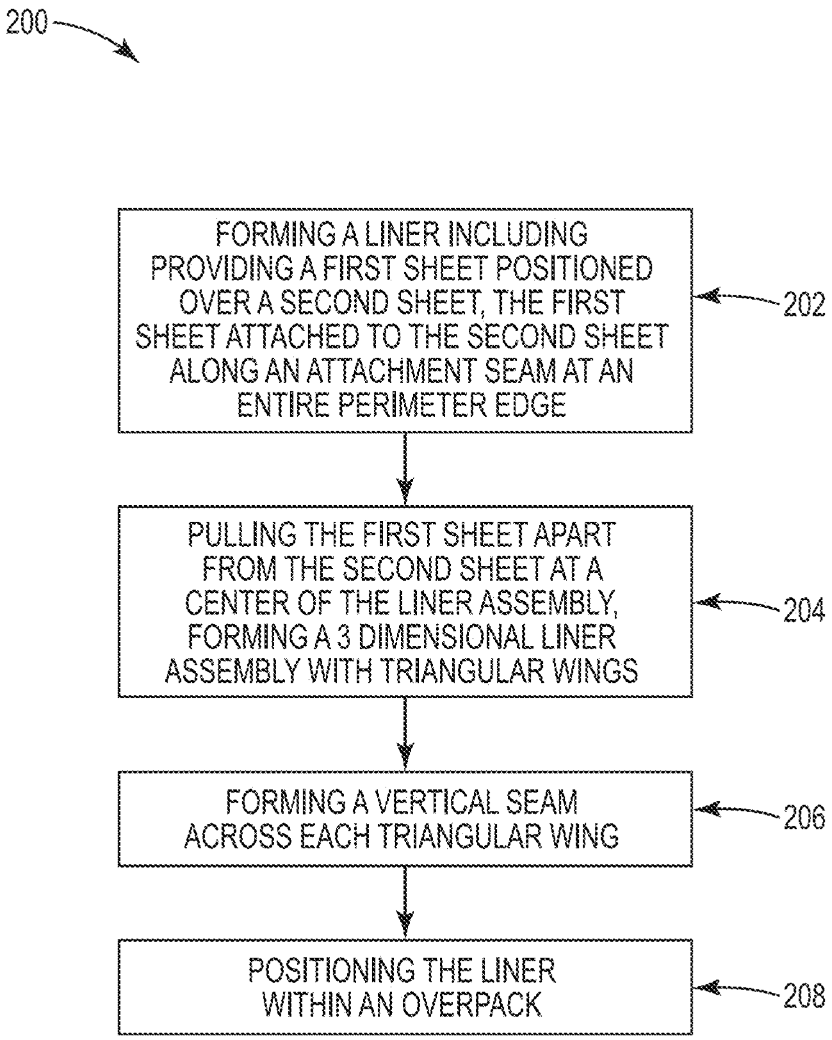
FIG. 3 is a block diagram of a method of making a liner suitable for use in an overpack assembly in accordance with an embodiment of the disclosure.

FIG. 3 is a flow diagram at 200 illustrating one embodiment of a method of making an overpack assembly including a liner. The liner can be similar to the liner 101 previously described herein. At 202, a liner is formed including positioning a first sheet over a second sheet. The first sheet is attached to the second sheet along an attachment seam at an entire perimeter edge. In one embodiment, the first sheet includes a fitment. At 204, the first sheet is pulled apart from the second sheet at a center of the liner, forming a three-dimensional liner with triangular wings. At 206, a vertical seam is formed across each triangular wing. In one embodiment, the vertical seam is perpendicular to the attachment seam. A length of the vertical seam corresponds to the height of the liner when in use (i.e., when the liner is in an expanded state). At 208, the liner is positioned within an overpack.

Figure 4:
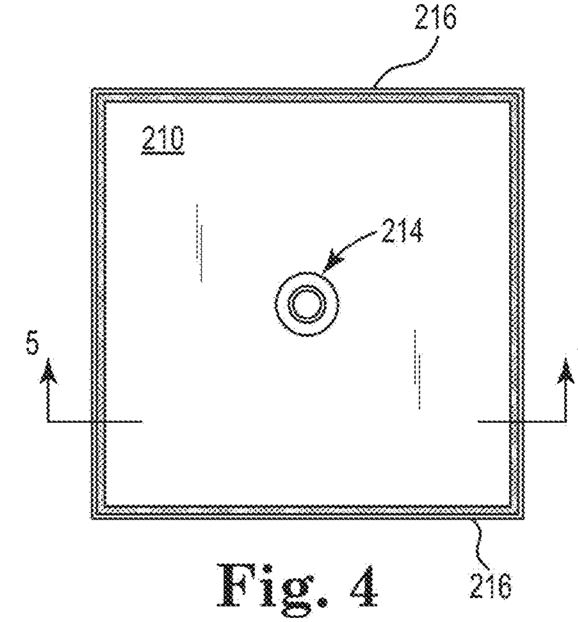
FIG. 4 is a diagram illustrating one step of a method making a liner including a first sheet positioned over a second sheet in accordance with an embodiment of the disclosure.

FIGS. 4-12 illustrate in detail one embodiment of a method of making a liner suitable for use with an overpack assembly, including making a three-dimensional liner from a two-dimensional liner. The liner is similar to liner 101 previously described in this specification. In FIG. 4, a first sheet 210 is positioned over a second sheet 212 (See FIG. 5). In this embodiment, first sheet 210 and second sheet 212 have a square shape. First sheet 210 includes a fitment 214. In one embodiment, the fitment 214 is centrally located on first sheet 210. First sheet 210 is attached to the second sheet 212 along an attachment seam at an entire perimeter edge, indicated as liner perimeter seam 216. In one embodiment, liner perimeter seam 216 is a welded seam, and is formed by welding the first sheet 210 to the second sheet 212.

Figure 5:
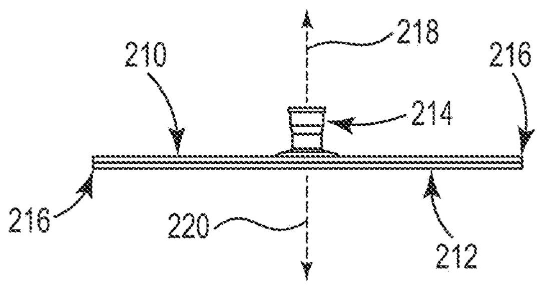
FIG. 5 is a cross-sectional view of the liner shown in FIG. 4 taken along line 5-5.

FIG. 5 is a diagram illustrating one embodiment of a cross-sectional view taken along 5-5 of FIG. 4. First sheet 210 is pulled apart from second sheet 212 at a center of the liner, indicated by central arrows 218, 220. First sheet 210 is pulled relative to second sheet 212. As such, both sheets 210 and 212 may be pulled apart in opposite directions by pulling first sheet at a central location in a first direction, indicated by arrow 218, and at the same time pulling second sheet 212 at a central location in an opposite direction, indicated by arrow 220. Alternatively, one sheet can be held steady (e.g., sheet 212) and the other sheet can be pulled at a center of the liner (e.g., sheet 210).

Figure 6:
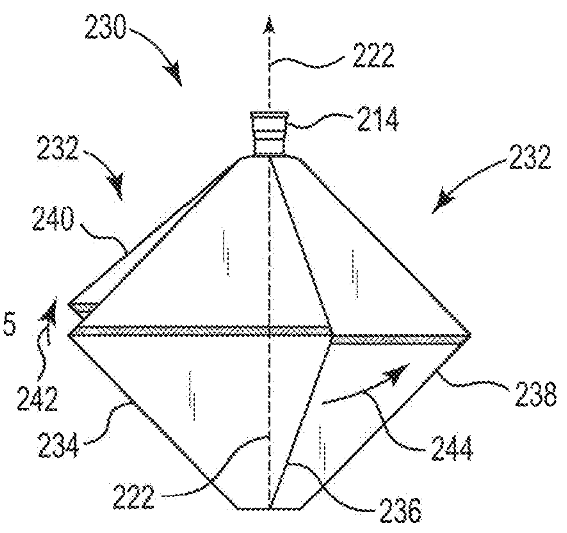
FIG. 6 is a diagram illustrating one step of a method of making a liner including forming a three-dimensional liner in accordance with an embodiment of the disclosure.

FIG. 6 is a diagram illustrating one embodiment of making a liner after first sheet 210 is pulled apart from second sheet 212. By pulling first sheet 210 apart from second sheet 212 along central axis 222, a three-dimensional liner 230 is formed with triangular wings 232. In the illustrative embodiment, the triangular wings 232 include triangular wing 234, triangular wing 236, triangular wing

Figure 7:
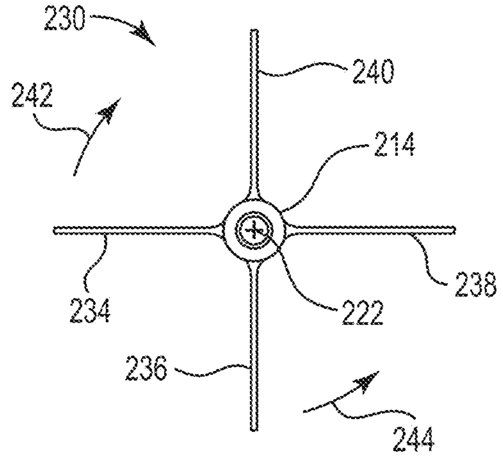
FIG. 7 is a top view of the liner shown in FIG. 6.
Figure 8:
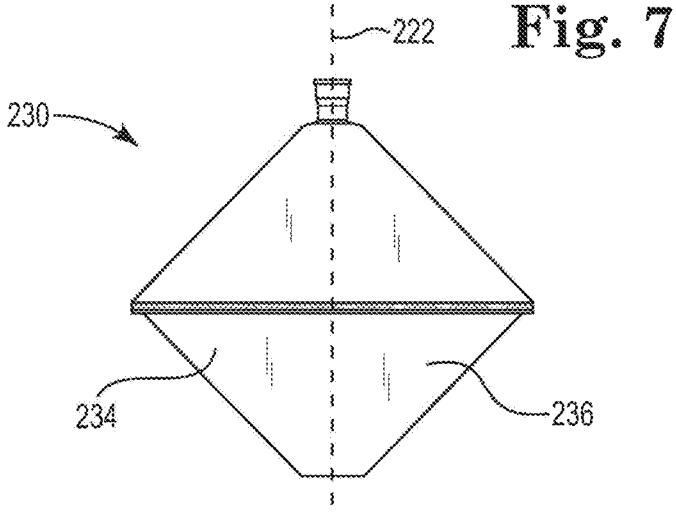
FIG. 8 is a diagram illustrating one step of a method of making a liner in accordance with an embodiment of the disclosure.

238, and triangular wing 240. FIG. 7 is a diagram illustrating one embodiment of a top view of the liner of FIG. 6. Each triangular wing 234, 236, 238, and 240 extends outward from central axis 222. Pairs of triangular wings are flattened against each other to form a flattened liner 230. Triangular wing 234 is flattened against triangular wing 240, indicated by directional arrow 242. Triangular wing 236 is flattened against triangular wing 240, indicated by directional arrow 244. FIG. 8 is a diagram illustrating one embodiment of liner 230 in a flattened position. Triangular wing 234 is flattened against triangular wing 240. Triangular wing 236 is flattened against triangular wing 238.

Figure 9:
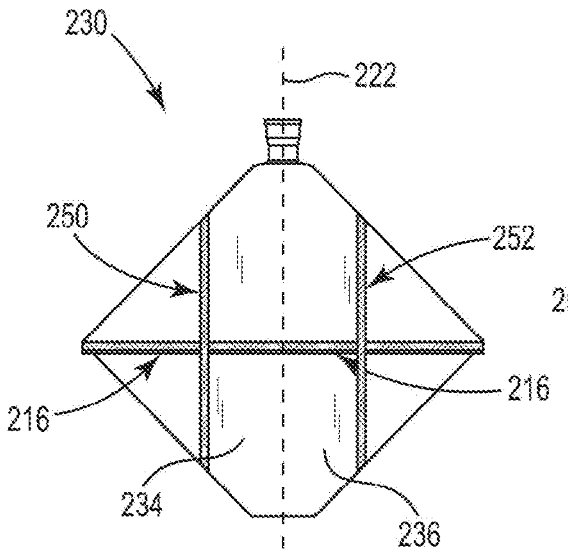
FIG. 9 is a diagram illustrating one step of a method of making a liner including forming vertical seams in accordance with an embodiment of the disclosure.

FIG. 9 is a diagram illustrating one embodiment of making a liner including forming vertical seams in the liner. A vertical seam is formed across each triangular wing. The length of the vertical seam corresponds to the final height of the liner when it is in an expanded state. In one illustrative embodiment, vertical seam 250 is formed on triangular wing 234 and vertical seam 252 is formed on triangular wing 236. In one embodiment, vertical seam 250 and vertical seam 252 are substantially perpendicular to perimeter seam 216. In other embodiments, vertical seam 250 and vertical seam 252 are not substantially perpendicular to perimeter seam 216. In a similar manner, vertical seams are also formed on triangular wing 238 and triangular wing 240. In one or more embodiments, the vertical seams are formed using a seam welding process.

Figure 10:
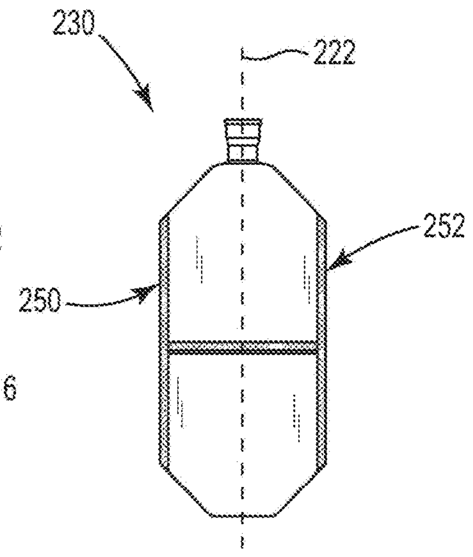
FIG. 10 is a diagram illustrating one step of a method of making a liner including truncating the triangular wings illustrated in FIG. 9 in accordance with an embodiment of the disclosure.
Figure 11:
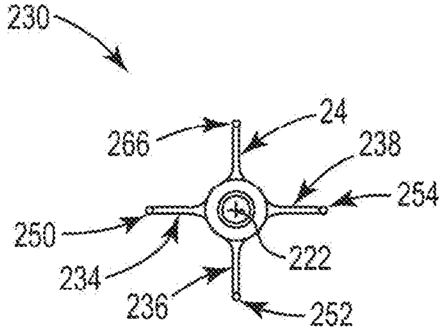
FIG. 11 is a top view of the liner of FIG. 9.

FIG. 10 is a diagram illustrating one embodiment of making a liner including truncating the triangular wings illustrated in FIG. 9. Reference is also made to FIG. 11 which is a top view of the liner of FIG. 10 when each of the triangular wings are extending from a central axis. Each triangular wing is truncated along its vertical seam. Triangular wing 234 is truncated along vertical seam 250; triangular wing 236 is truncated along vertical seam 252; triangular wing 238 is truncated along vertical seam 254; and triangular wing 240 is truncated along vertical seam 256. Liner 230 is now complete and ready for use.

Figure 12:
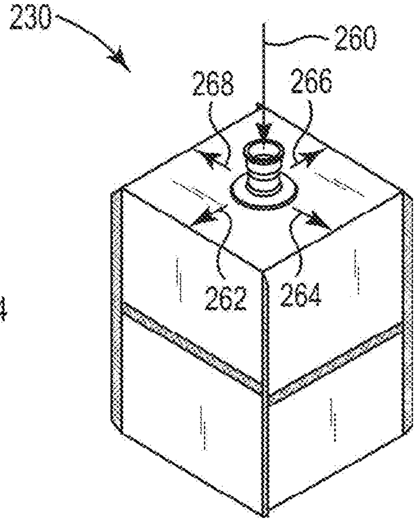
FIG. 12 is a perspective view of a liner in an expanded state in accordance with an embodiment of the disclosure.

FIG. 12 is a diagram illustrating one embodiment of a completed liner in an expanded state, as it would appear within an overpack. As liner 230 is filled with a material or air (illustrated by fill arrow 260), the liner 230 sides expand outward from central axis 222 (illustrated by expansion arrows 262, 264, 266, 268). In an expanded state, the liner 230 is generally box shaped and has a generally square-shaped top and a generally square-shaped bottom. When positioned within an overpack, it is recognized that the liner will take on the internal shape of the overpack.

The completed liner 230 is similar to the liner 101 previously described in detail herein. Liner 230 includes liner body 274 having a liner top 280, a liner bottom 282, and four sides 284. A liner perimeter seam 216 extends substantially horizontally across the four sides 284. A side seam 252, 254, 256, 258 extends vertically between each corresponding adjacent side 290, 292, 294, 296. Fitment 214 extends from top 280. A seamless transition exists between the top 280 and the four sides 284. In a similar manner, a seamless transition exists between the bottom 282 and the four sides 284. With this configuration, completed liner 230 is a three-dimensional liner that is formed from a two-dimensional liner allowing for easy assembly and use.

It is recognized that the liner in accordance with this disclosure can vary in shape based in using different design parameters, and still be within the scope of this specification. FIGS. 13-17 are diagrams illustrating one embodiment of a method of making a liner having a box shape with a rectangular-shaped top and bottom. The liner is similar to the liner assemblies previously described herein.

Figure 13:
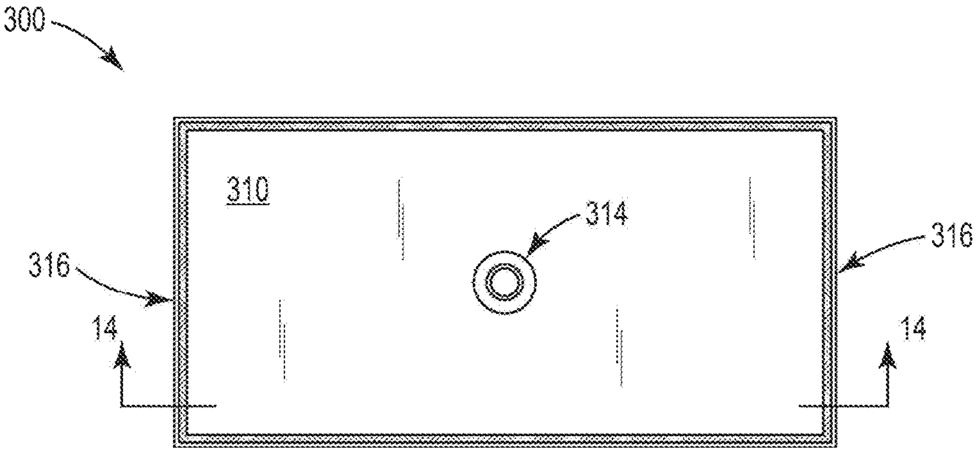
FIG. 13 is a diagram illustrating one step of a method of making a liner having a rectangular shape in accordance with an embodiment of the disclosure.

FIG. 13 illustrates one embodiment of making a three-dimensional rectangular liner from a two-dimensional liner generally at 300. A first sheet 310 is positioned over a second sheet 312 (See also FIG. 14). In this embodiment, first sheet 310 and second sheet 312 have a rectangular shape. First sheet 310 includes a fitment 314. In one embodiment, the fitment 314 is centrally located on first sheet 310. First sheet 310 is attached to the second sheet 312 along an attachment seam at an entire perimeter edge, indicated as liner perimeter seam 316. In one embodiment, liner perimeter seam 316 is a welded seam, and is formed by welding the first sheet 310 to the second sheet 312.

Figure 14:
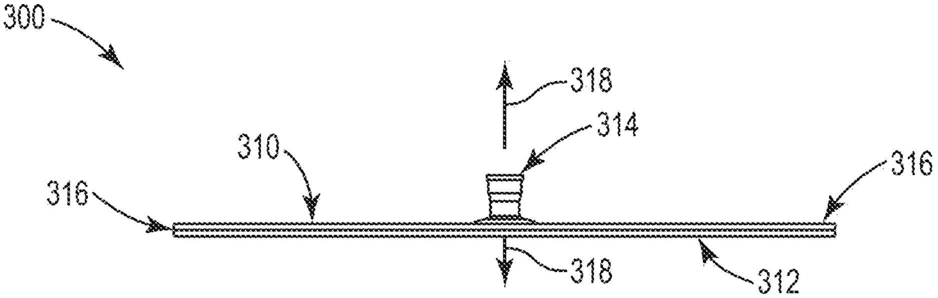
FIG. 14 is a cross-sectional view of the liner of FIG. 13 taken along line 14-14.

FIG. 14 is a diagram illustrating one embodiment of a cross-sectional view taken along 14-14 of FIG. 13. To form a three-dimensional liner from a two-dimensional liner, first sheet 310 is pulled apart from second sheet 312 at a center of the liner, indicated by central arrows 318, 320. First sheet 310 is pulled relative to second sheet 312. As such, both sheets 310 and 312 may be pulled apart in opposite directions by pulling first sheet at a central location in a first direction, indicated by arrow 318, and at the same time pulling second sheet 312 at a central location in an opposite direction, indicated by arrow 320. Alternatively, one sheet can be held steady (e.g., sheet 312) and the other sheet can be pulled at a center of the liner (e.g., sheet 310).

Figure 15:
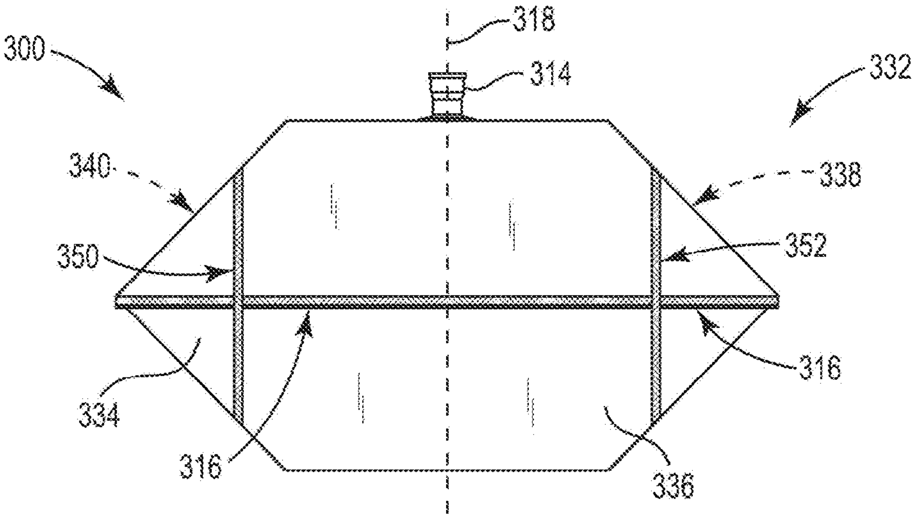
FIG. 15 is a diagram illustrating one step of a method of making a liner including forming vertical seams in accordance with an embodiment of the disclosure.

FIG. 15 is a diagram illustrating one embodiment of making a liner after first sheet 310 is pulled apart from second sheet 312. By pulling first sheet 310 apart from second sheet 312 along central axis 322, a three-dimensional liner 330 is formed with wings 332. In the illustrative embodiment, the wings 332 include wing 334, wing 336, wing 338 (indicated by dashed arrow and hidden from view), and wing 340 (indicated by dashed arrow and hidden from view). Each wing 334, 336, 338, and 340 extends outward from central axis 322. Pairs of wings are flattened against each other to form a flattened liner 330. Wing 334 is flattened against wing 340. Wing 336 is flattened against wing 340.

Vertical seams are formed in the liner. A vertical seam is formed across each wing. The length of the vertical seam corresponds to the final height of the liner when it is in an expanded state. In one illustrative embodiment, vertical seam 350 is formed on wing 334 and vertical seam 352 is formed on wing 336. In one embodiment, vertical seam 350 and vertical seam 352 are substantially perpendicular to perimeter seam 316. In other embodiments, vertical seam 350 and vertical seam 352 are not substantially perpendicular to perimeter seam 316. In a similar manner, vertical seams are also formed on wing 338 and wing 340. In one or more embodiments, the vertical seams are formed using a seam welding process.

Figure 16:
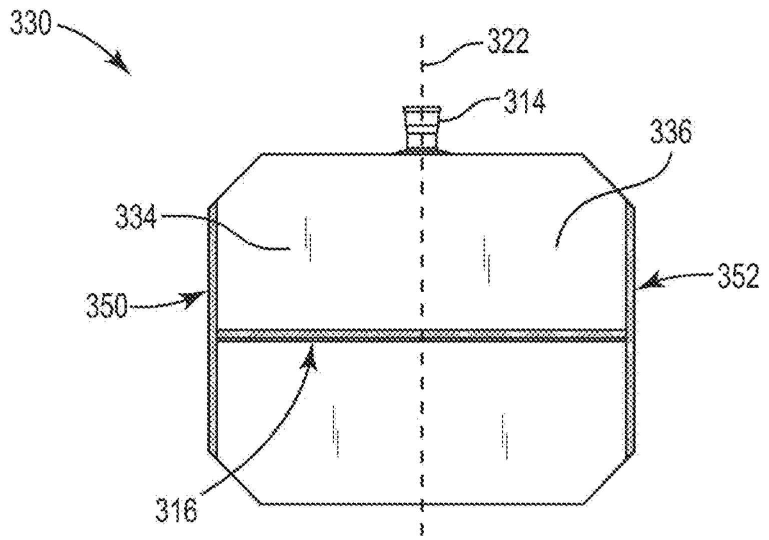
FIG. 16 is a diagram illustrating one step of a method of making a liner including truncating the triangular wings of the liner shown in FIG. 15 in accordance with an embodiment of the disclosure.

FIG. 16 is a diagram illustrating one embodiment of making a liner including truncating the wings illustrated in FIG. 15. Each wing is truncated along its vertical seam. Wing 334 is truncated along vertical seam 350; Wing 336 is truncated along vertical seam 352; Wing 338 is truncated along vertical seam 354; and Wing 340 is truncated along vertical seam 356. Liner 330 is now complete and ready for use.

Figure 17:
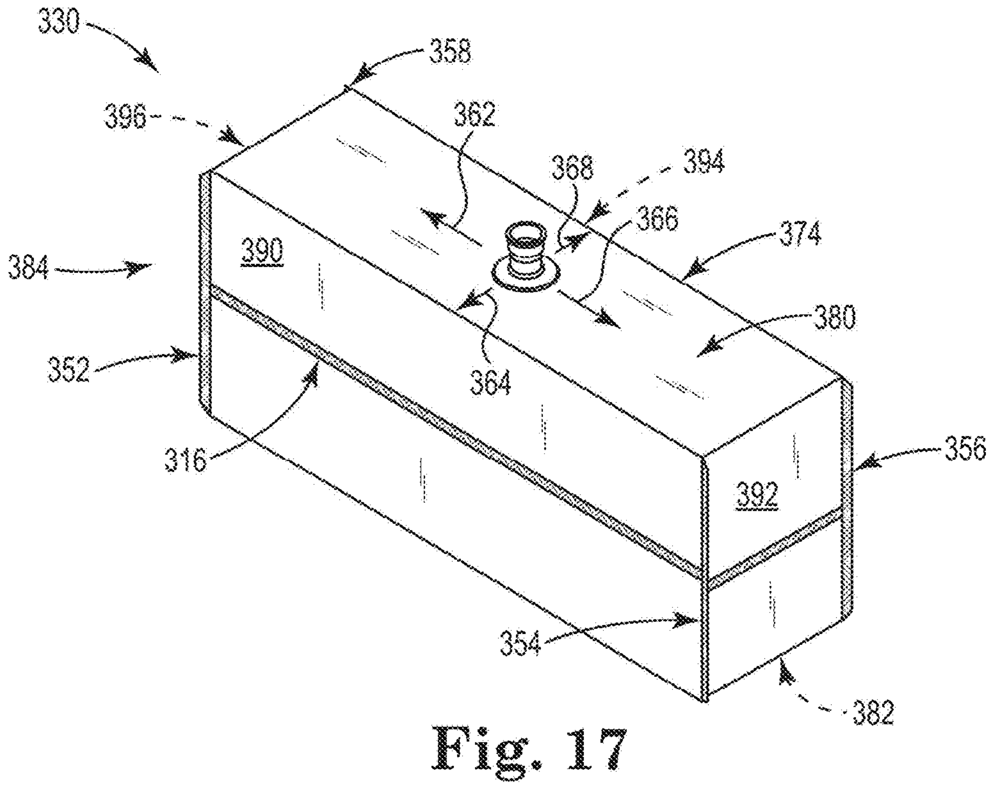
FIG. 17 is a perspective view of a rectangular-shaped liner in an expanded state.

FIG. 17 is a diagram illustrating one embodiment of a completed liner in an expanded state, as it would be when positioned for use within an overpack. As liner 330 is filled with a material or air (illustrated by fill arrow 360), the liner 330 sides expand outward from central axis 322 (illustrated by expansion arrows 362, 364, 366, 368). In an expanded state, the liner 330 is generally box shaped and has a generally rectangular-shaped top and a generally rectangular-shaped bottom.

The completed liner 330 is similar to the liners 101 and 230 previously described in detail herein. Liner 330 includes liner body 374 having a liner top 380, a liner bottom 382, and four sides 384. A liner perimeter seam 316 extends substantially horizontally across the four sides 384. A side seam 352, 354, 356, 358 extends vertically between each corresponding adjacent side 390, 392, 394, 396. Fitment 314 extends from top 380. A seamless transition exists between the top 380 and the four sides 384. In a similar manner, a seamless transition exists between the bottom 382 and the four sides 384. With this configuration, completed liner 330 is a three-dimensional liner that is formed from a two-dimensional liner allowing for easy assembly and use.

In use, the liner may be inserted into the overpack when the liner is in a collapsed state through a neck of the overpack. Once the liner has been positioned inside the overpack, the liner may be expanded to an expanded state. In some embodiments, the liner may be inflated with a clean gas, for example, N2, or clean dry air, prior to filling the liner with the desired material. In other embodiments, the liner may be expanded with a chemical or the chemical or material to be filled. After the liner has been filled with the desired material, the closure and/or connector assembly for the overpack may be detachably secured to the fitment of the liner. The system may be then shipped to a desired location or stored until shipped. Upon arrival at a desired location, the contents of the liner may be dispensed.

Liners of the present disclosure are relatively easier to insert into an overpack than traditional liners as a result of the advantageous method of folding the liner prior to insertion as disclosed herein. FIGS. 18-22 illustrate one embodiment of a process of folding a liner in accordance with the present disclosure, and inserting the liner into a container such as an overpack. It is understood that the terms bottom, top, upward, downward, outward, inward etc. are not intended to limit the present disclosure, but are used to describe a particular embodiment.

Figure 18:
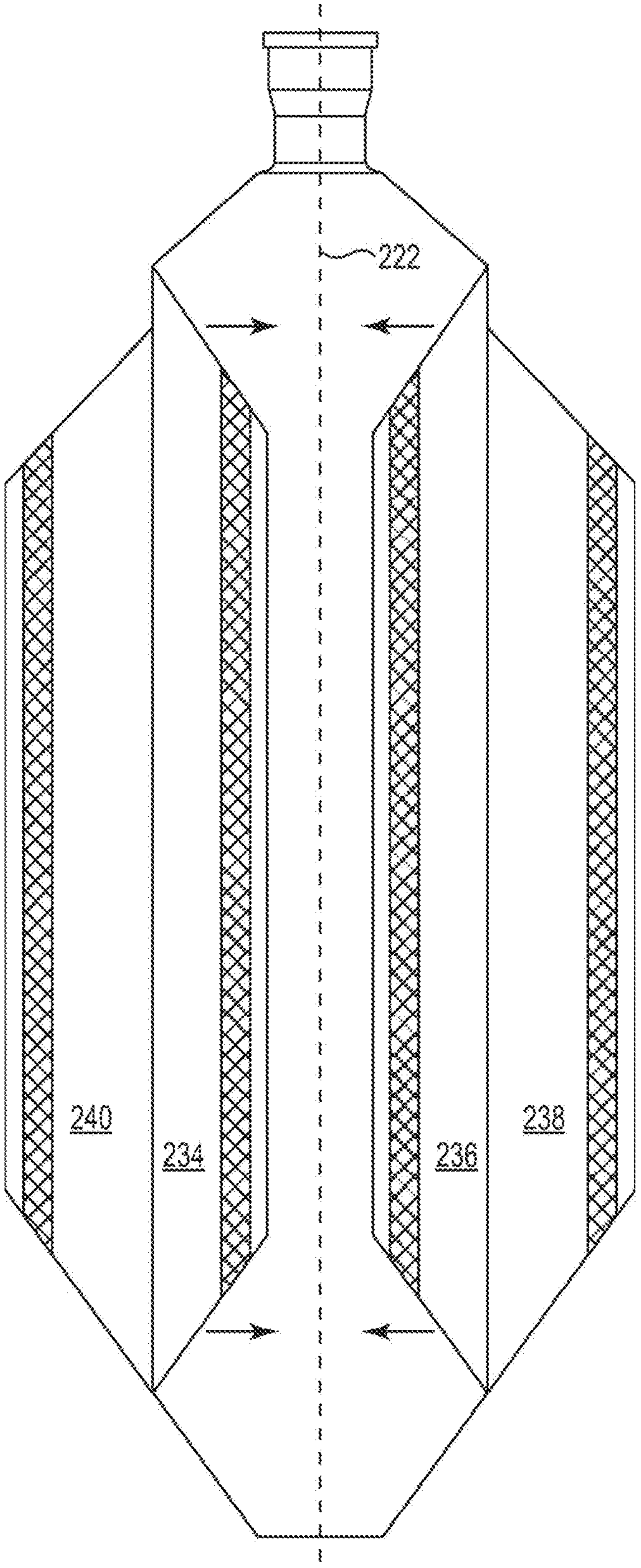
FIG. 18 is a diagram illustrating one step of a method of folding a liner for positioning within an overpack in accordance with an embodiment of the disclosure.
Figure 19:
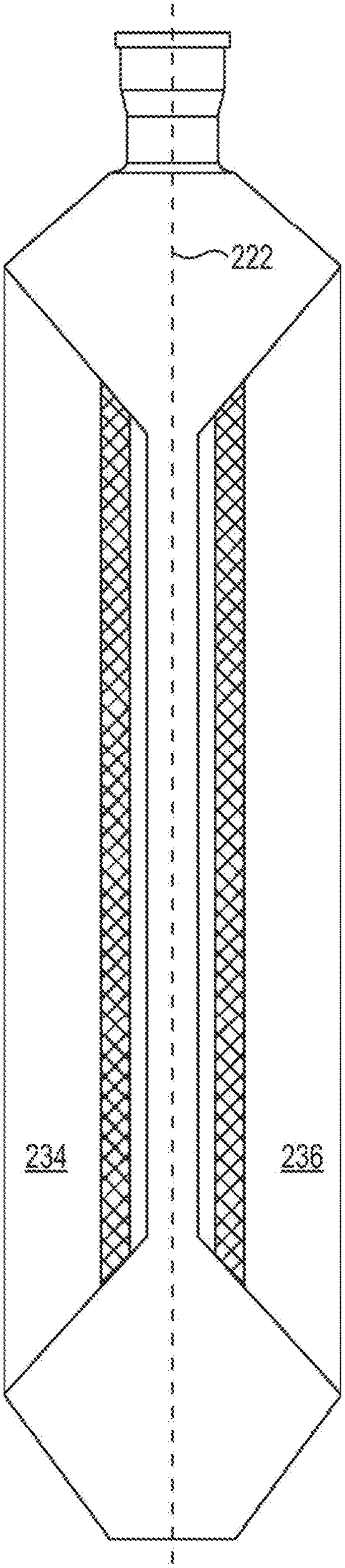
FIG. 19 is a diagram further illustrating one step of a method of folding a liner for positioning the liner in an overpack in accordance with an embodiment of the disclosure.

FIG. 18 is a diagram illustrating one embodiment of a method of making an overpack assembly, including folding a liner for positioning the liner in an overpack. The liner can be similar to liner 230 previously described in this specification. Each of the truncated wings are individually folded inward towards the center of liner 230. In one illustrative embodiment, wing 234 is folded inward towards central axis 222. In a similar manner, wing 236 is also shown folded inward towards central axis 222. In reference also to FIG. 19, this method is continued until all of the wings 234, 236, 238, and 240 are folded inward towards central axis 222.

Figure 20:
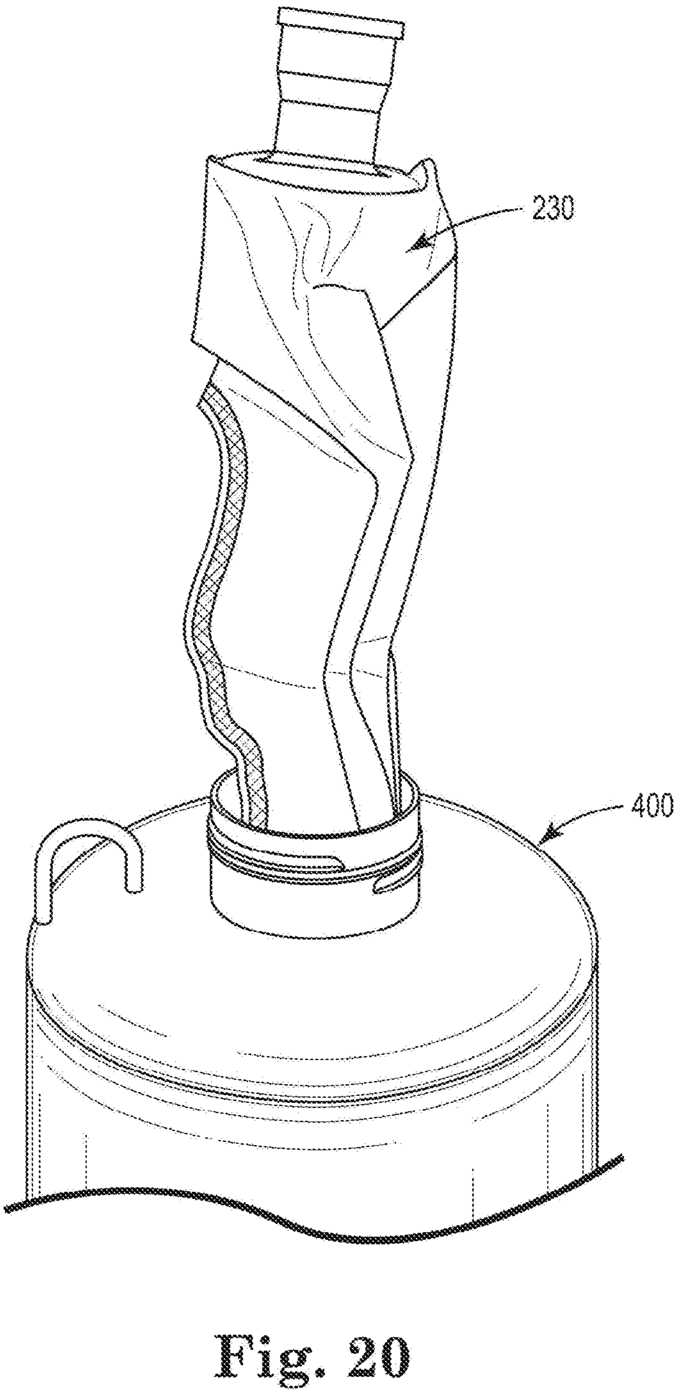
FIG. 20 is a diagram illustrating one step of a method of making an overpack assembly, including inserting a folded liner in an overpack.
Figure 21:
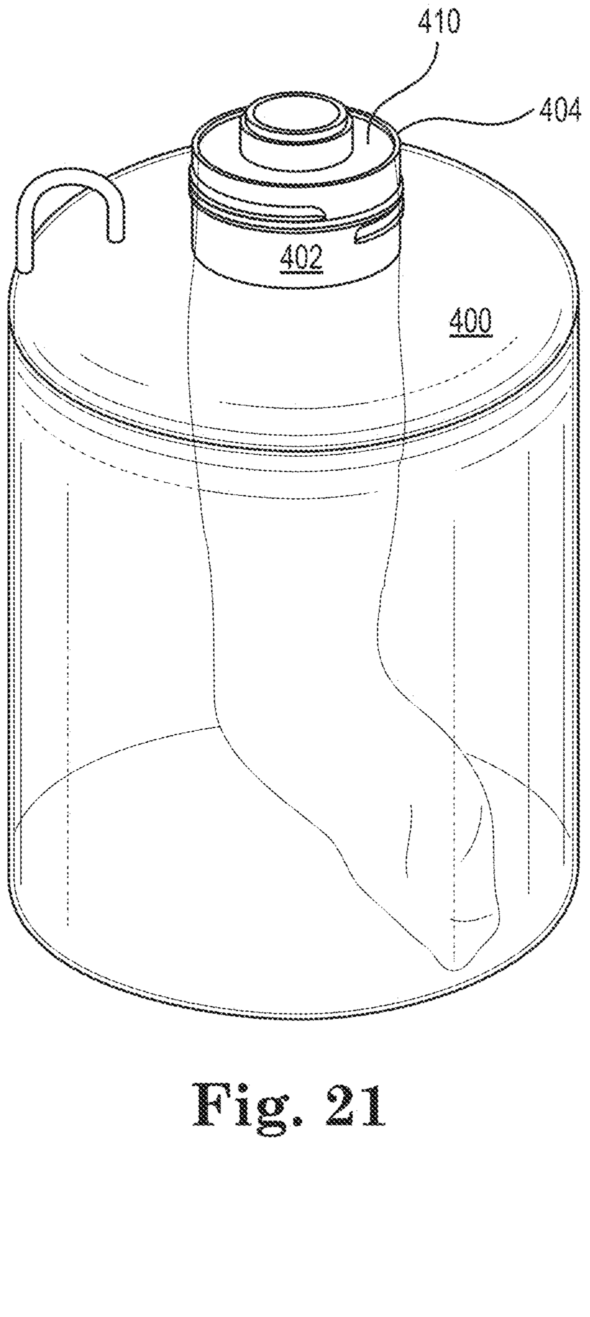
FIG. 21 is a perspective view of an overpack assembly, including a liner positioned in an overpack, where the liner is in an expanded state within the overpack in accordance with an embodiment of the disclosure.

Next, as illustrated in FIG. 20, liner 230 is at least partially folded and inserted into an opening in overpack 400. In this embodiment, the overpack 400 is a cylindrically shaped container. Overpack 400 includes a neck 402 having an opening 404. The liner 230 is inserted into the overpack 400 through opening 404. In reference also to FIG. 21, a retainer 410 is positioned about fitment 214. Retainer 410 is configured to secure the liner 230 in overpack 400 by retaining the fitment 214 within the neck 402. Liner 230 is now positioned securely within overpack 400.

Figure 22:
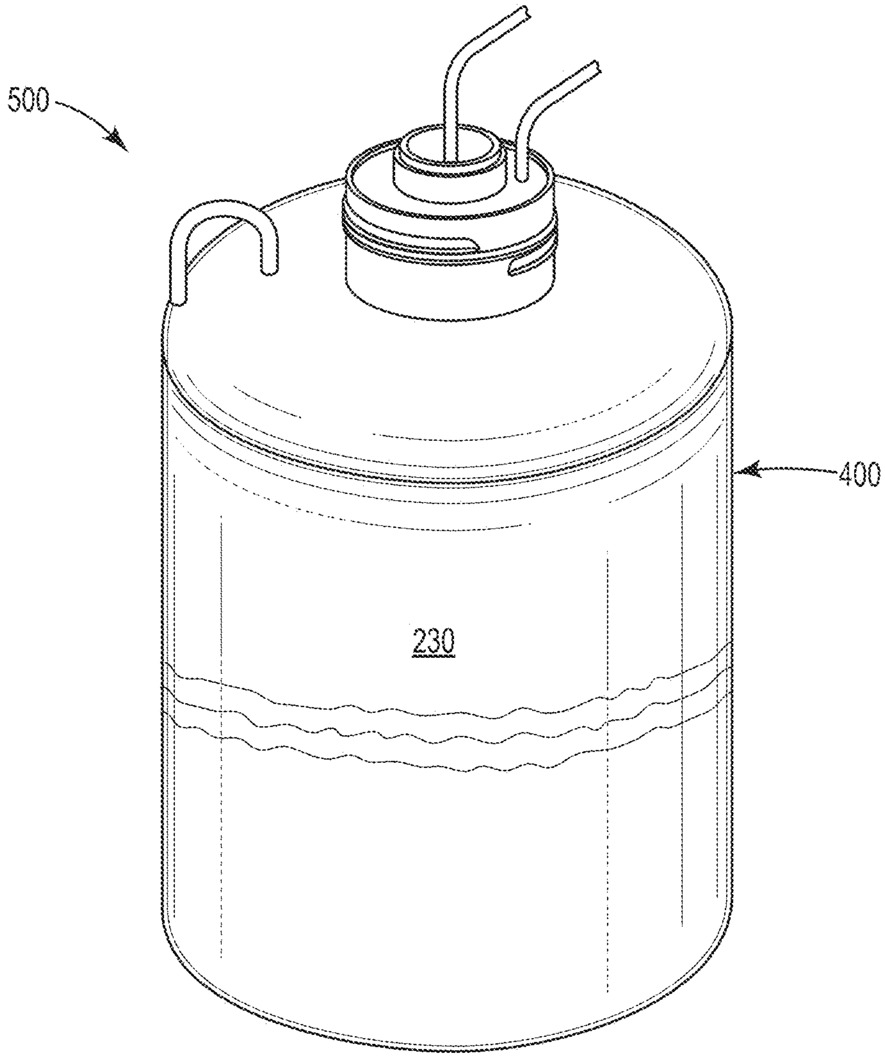
FIG. 22 is a diagram illustrating one example of an overpack assembly, including a liner positioned in an overpack, where the liner is in an expanded state within the overpack.

FIG. 22 is a diagram illustrating one embodiment of an overpack assembly 500 including liner 230 positioned within overpack 400 in an expanded state. Once the liner 230 has been securely positioned inside overpack 400, the liner may be expanded to an expanded state. Once expanded, the liner 230 takes on the interior shape of the overpack. As such, when inflated a rectangular-shaped liner will take on a rectangular shape when positioned within a rectangular-shaped overpack. That same liner will take on a cylindrical shape when positioned within an overpack having an interior with a cylindrical shape overpack.

In some embodiments, the liner may be inflated with a clean gas, for example, N2, or clean dry air, prior to filling the liner with the desired material. In other embodiments, the liner may be expanded with a chemical or the chemical or material to be filled. After the liner has been filled with the desired material, the closure and/or connector assembly for the overpack may be detachably secured to the fitment of the liner. The system may be then shipped to a desired location or stored until shipped. Upon arrival at a desired location, the contents of the liner may be stored or dispensed.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respects, only illustrative. Changes may be made in the details, particularly in matters of shape, size, and arrangement of parts without exceeding the scope of the disclosure. The disclosure's scope is, of course, defined in the language in which the appended claims are expressed.

What is claimed is:

1. An overpack assembly comprising:
an overpack; and
a liner positioned within the overpack, the liner comprising:
a box shaped liner body made of a fluoropolymer material having a top surface, a bottom surface, and four side surfaces;
a liner seam extending substantially horizontally across the middle of each of the four side surfaces;
a side seam extending vertically between each adjacent side surface; and
a fitment extending from the top surface,
wherein the liner seam and each side seam is a weld seam,
wherein an interface between the top surface and each side surface is void of a seam,
wherein an interface between the bottom surface and each side surface is void of a seam, and
wherein the liner seam and the side seams are the only seams in the box shaped liner body.

2. The overpack assembly of claim 1, wherein the box shaped liner body is formed from two rectangular sheets.

3. The overpack assembly of claim 2, wherein the two rectangular sheets are square-shaped.

4. The overpack assembly of claim 1, wherein the fitment includes a cap, a dispensing tube, and a fill tube.

5. The overpack assembly of claim 1, wherein the overpack is rectangular-shaped.

6. The overpack assembly of claim 1, wherein the overpack is cylindrical shaped.

7. An overpack assembly comprising:
an overpack; and
a liner positioned within the overpack, the liner comprising:
a box shaped liner body made of a fluoropolymer material having a top surface, a bottom surface, and four side surfaces;
a liner seam extending substantially horizontally across the middle of each of the four side surfaces;

a side seam extending vertically between each adjacent side surface; and a fitment extending from the top surface, wherein an interface between the top surface and each side surface is void of a seam, and wherein an interface between the bottom surface and each side surface is void of a seam.

8. The overpack assembly of claim 7, wherein the liner seam and each side seam is a weld seam.

9. The overpack assembly of claim 7, wherein the overpack is rectangular-shaped.

10. The overpack assembly of claim 7, wherein the overpack is cylindrical shaped.

* * * * *